United States Patent
Ueda et al.

(10) Patent No.: US 11,884,809 B2
(45) Date of Patent: Jan. 30, 2024

(54) MOLDED ARTICLE AND LAMINATE INCORPORATING ACRYLIC RESIN COMPOSITION

(71) Applicant: ADEKA CORPORATION, Tokyo (JP)

(72) Inventors: Naoto Ueda, Saitama (JP); Kazukiyo Nomura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 16/044,011

(22) Filed: Jul. 24, 2018

(65) Prior Publication Data

US 2018/0327584 A1    Nov. 15, 2018

Related U.S. Application Data

(62) Division of application No. 15/522,442, filed as application No. PCT/JP2015/080914 on Nov. 2, 2015, now abandoned.

(30) Foreign Application Priority Data

Dec. 18, 2014   (JP) ................... 2014-256205

(51) Int. Cl.
| | |
|---|---|
| C08L 33/12 | (2006.01) |
| B32B 27/30 | (2006.01) |
| B32B 27/36 | (2006.01) |
| C08J 5/00 | (2006.01) |
| C08K 5/3492 | (2006.01) |
| B32B 7/04 | (2019.01) |
| B32B 27/08 | (2006.01) |
| B32B 27/18 | (2006.01) |
| C08J 5/18 | (2006.01) |
| B29D 99/00 | (2010.01) |
| B32B 27/20 | (2006.01) |

(52) U.S. Cl.
CPC .............. *C08L 33/12* (2013.01); *B32B 7/04* (2013.01); *B32B 27/08* (2013.01); *B32B 27/18* (2013.01); *B32B 27/20* (2013.01); *B32B 27/30* (2013.01); *B32B 27/304* (2013.01); *B32B 27/308* (2013.01); *B32B 27/36* (2013.01); *B32B 27/365* (2013.01); *C08J 5/00* (2013.01); *C08J 5/18* (2013.01); *C08K 5/3492* (2013.01); *B29D 99/006* (2013.01); *B29D 99/0057* (2013.01); *B32B 2250/00* (2013.01); *B32B 2250/02* (2013.01); *B32B 2250/24* (2013.01); *B32B 2250/246* (2013.01); *B32B 2262/101* (2013.01); *B32B 2264/10* (2013.01); *B32B 2264/101* (2013.01); *B32B 2264/102* (2013.01); *B32B 2264/104* (2013.01); *B32B 2270/00* (2013.01); *B32B 2307/306* (2013.01); *B32B 2307/3065* (2013.01); *B32B 2307/40* (2013.01); *B32B 2307/71* (2013.01); *B32B 2307/712* (2013.01); *B32B 2419/00* (2013.01); *B32B 2451/00* (2013.01); *B32B 2471/00* (2013.01); *B32B 2590/00* (2013.01); *B32B 2605/006* (2013.01); *B32B 2607/00* (2013.01); *B32B 2607/02* (2013.01)

(58) Field of Classification Search
None
See application file for complete search history.

(56) References Cited

U.S. PATENT DOCUMENTS

| | | | |
|---|---|---|---|
| 6,620,509 B1 | 9/2003 | Yamamoto et al. | |
| 8,088,847 B2* | 1/2012 | Numrich | C08J 7/0427 524/91 |
| 2008/0194731 A1 | 8/2008 | Herbst et al. | |
| 2010/0247811 A1 | 9/2010 | Yokota et al. | |
| 2011/0073171 A1 | 3/2011 | Pickett | |
| 2011/0272648 A1* | 11/2011 | Fukushima | C08K 5/527 252/589 |
| 2012/0302676 A1* | 11/2012 | Oya | C08K 5/29 524/89 |
| 2015/0044439 A1* | 2/2015 | Ooaira | B29C 48/305 428/215 |
| 2018/0100063 A1* | 4/2018 | Kodera | G02B 6/0066 |

FOREIGN PATENT DOCUMENTS

| | | |
|---|---|---|
| JP | 2000-169767 | 6/2000 |
| JP | 2000-327802 | 11/2000 |
| JP | 2004-250582 | 9/2004 |
| JP | 2008-519152 | 6/2008 |
| JP | 2008-158295 A | 7/2008 |

(Continued)

OTHER PUBLICATIONS

JP-2009286960-A, Dec. 2009, Machine Translation (Year: 2009).*
International Search Report, PCT/JP2015/080914, dated Jan. 19, 2016.
Liu et al., "Plastics Extruding Engineer (Intermediate and Senior) Training Tutorials," Printing Industry Publishing House (No. 2, Cuiwei Road, Beijing; Postcode: 100036), Jan. 2013, ISBN: 978-7-5142-0755-2, pp. 27-29.

(Continued)

*Primary Examiner* — Satya B Sastri
(74) *Attorney, Agent, or Firm* — NIXON & VANDERHYE

(57) ABSTRACT

Disclosed is an acrylic resin composition that has excellent weather resistance and can be stably produced at high temperatures. Specifically, disclosed is an acrylic resin composition including, with respect to 100 parts by mass of an acrylic resin, from 0.1 to 8 parts by mass of a triazine-based UV absorber including 2-(4,6-diphenyl-1,3,5-triazin-2-yl)-5-[2-(2-ethylhexanoyloxy)ethoxy]phenol, wherein the acrylic resin used is an acrylic resin including at least 80 wt % of methyl methacrylate as a monomer component, and having a glass transition temperature of at least 80° C.

3 Claims, No Drawings

(56) References Cited

FOREIGN PATENT DOCUMENTS

| | | |
|---|---|---|
| JP | 2008-260886 | 10/2008 |
| JP | 2009-098701 | 5/2009 |
| JP | 2009-286960 | 12/2009 |
| JP | 2009286960 A * | 12/2009 |
| JP | 2011-016277 | 1/2011 |
| JP | 2011009547 | 1/2011 |
| JP | 2014-024217 A | 2/2014 |
| JP | 5987526 B2 | 9/2016 |
| WO | WO 2013/141334 | 8/2015 |

OTHER PUBLICATIONS

Anonymous, "Extrusion Technique of Profile," Proceedings of China Seminar on Engineering Plastics Processing Application Technology in 2004, China Plastics Processing Industry Association's Engineering Plastics Industry Association, College of Polymer Science and Engineering, Sichuan University, Sep. 2004, pp. 316-317.

* cited by examiner

MOLDED ARTICLE AND LAMINATE INCORPORATING ACRYLIC RESIN COMPOSITION

TECHNICAL FIELD

The present invention relates to an acrylic resin composition that includes a specific triazine-based UV absorber in an acrylic resin including at least 80 wt % of methyl methacrylate and having a glass transition temperature of at least 80° C., and a laminate of the acrylic resin composition.

BACKGROUND ART

Molded articles made of an acrylic resin including methyl methacrylate as a main component particularly have excellent transparency among plastic materials. By making use of this characteristic, acrylic-resin molded articles are used for applications in which aesthetic appearance is deemed important and for protective sheets that cover various plastic materials.

Weather resistance, scratch resistance, contamination resistance, and the ability to adjust surface luster are demanded of protective sheets; among these characteristics, importance is placed particularly on excellent weather resistance.

For example, Patent Literature 1 proposes a film as an insect-repellent protective film for lighting covers, shop windows, vending machine surface panels, and glazing, wherein the film includes an acrylic resin blended with, for example, an azomethine-based UV absorber, an indole-based UV absorber, a benzophenone-based UV absorber, a benzotriazole-based UV absorber, and/or a triazine-based UV absorber. Patent Literature 1 discloses that ultraviolet rays with wavelengths of 400 nm or below are blocked. Patent Literature 1, however, describes nothing about ultraviolet regions equal to or below 340 nm. Further, Patent Literature 1 employs an acrylic resin composition as a protective layer of a polycarbonate resin molded product, but the coloring prevention effect of the protective layer is unsatisfactory.

Patent Literature 2 discloses a protective film made by laminating, on a rigid PVC plate, an acrylic film wherein a triazine-based UV absorber is blended to an acrylic resin at a proportion of from 0.1 to 5 wt % and from 0.17 to 2.28 g/m². However, the coloring prevention effect of the protective layer is still not satisfactory.

Patent Literature 3 discloses a laminate that includes: a UV-absorber-containing acrylic resin layer coated on a surface of a polycarbonate resin substrate; and a cured layer formed by coating the acrylic resin layer with a composition including a silicone-containing polymer UV absorber and polyorganosiloxane, and then curing the composition. However, the coloring prevention effect of the coated product is still not satisfactory.

Patent Literature 4 discloses a resin laminate that includes: a UV-absorber-containing acrylic resin layer coated on a surface of a polycarbonate resin substrate; and a cured layer formed by coating the acrylic resin layer with a resin-coating composition including, at specific proportions, a mixture of organotrialkoxysilanes respectively including specific alkyl groups, colloidal silica containing anhydrous silica and having a particle diameter of from 4 to 20 nm, an amine carboxylate and/or quaternary ammonium carboxylate, and a silicone-containing polymer UV absorber, and then curing the composition. However, the coloring prevention effect of the laminate is still not satisfactory.

Patent Literature 5 discloses a decorative sheet formed by blending a UV absorber including 2-(4,6-diphenyl-1,3,5-triazin-2-yl)-5-[2-(2-ethylhexanoyloxy)ethoxy]phenol with respect to an acrylic resin including cyclohexyl (meth)acrylate as a monomer component. Examples of methods for forming such sheets include solution casting film formation methods and melt casting formation methods; the decorative sheet of Patent Literature 5 is formed by the solution casting film formation method. The solution casting film formation method is a manufacturing method of first dissolving acrylic resin in a solvent and then forming a film by removing the solvent. This method requires rinsing with water and drying, thus increasing manufacturing costs.

On the other hand, the melt casting formation method is a method of heating and melting acrylic resin, casting the melt onto a support and cooling and solidifying the same, and then drawing or rolling the same as necessary.

In cases where the acrylic resin of Patent Literature 5 is formed according to the melt casting formation method, granulation is possible by melting and mixing/kneading at a process temperature below 200° C., but the surface of the molded article becomes rough. Surface roughness of the molded article can be improved by melting and mixing/kneading at a process temperature of 200° C. or higher; however, performing melting and mixing/kneading at a temperature of 200° C. or higher reduces the melt viscosity of the acrylic resin, making molding impossible.

CITATION LIST

Patent Literature

Patent Literature 1: JP 2000-169767A
Patent Literature 2: JP 2000-327802A
Patent Literature 3: U.S. Pat. No. 6,620,509A
Patent Literature 4: JP 2004-250582A
Patent Literature 5: JP 2011-16277A

SUMMARY OF INVENTION

Technical Problem

The invention provides an acrylic resin composition that has excellent weather resistance and can be stably produced at high temperatures.

Solution to Problem

As a result of diligent research to solve the aforementioned problems, Inventors have found that the aforementioned problems can be solved by employing an acrylic resin having a specific composition ratio and a glass transition temperature of at least 80° C. and by including therein a specific triazine-based UV absorber, thus arriving at the present invention.

The invention provides an acrylic resin composition comprising, with respect to 100 parts by mass of an acrylic resin, from 0.1 to 8 parts by mass of a triazine-based UV absorber including 2-(4,6-diphenyl-1,3,5-triazin-2-yl)-5-[2-(2-ethylhexanoyloxy)ethoxy]phenol, wherein the acrylic resin includes at least 80 wt % of methyl methacrylate as a monomer component, and has a glass transition temperature of at least 80° C.

In the invention, it is preferable that the acrylic resin is obtained by polymerizing from 80 to 100 wt % of methyl methacrylate, and from 20 to 0 wt % of a linear or branched alkyl (meth)acrylate including at least two carbon atoms.

A molded article of the invention is obtained by melting and mixing/kneading the aforementioned acrylic resin composition within a temperature range of from 200 to 260° C.

A laminate of the invention is a laminate in which a surface of a support material is covered by a thermoplastic resin layer having a thickness of from 30 to 300 µm, wherein the thermoplastic resin layer is formed by melting and mixing/kneading the aforementioned acrylic resin composition within a temperature range of from 200 to 260° C.

In the invention, it is preferable that, in the laminate, the support material is a vinyl chloride resin or a polycarbonate resin.

Advantageous Effects of Invention

The invention can provide an acrylic resin composition that has excellent weather resistance and can be stably produced at high temperatures.

DESCRIPTION OF EMBODIMENTS

The invention is described in detail below according to preferred embodiments.

In the invention, the acrylic resin is a homopolymer of methyl methacrylate, or a copolymer including at least 80 wt % of methyl methacrylate.

Examples of monomers that may be included together with methyl methacrylate in the copolymer include (meth)acrylates other than methyl methacrylate, and other monomer components. Note that, in the present invention, (meth)acrylate refers to methacrylate, acrylate, and mixtures thereof.

Examples of (meth)acrylates other than methyl methacrylate include (meth)acrylates, ethyl (meth)acrylate, propyl (meth)acrylate, n-butyl (meth)acrylate, t-butyl (meth)acrylate, isobutyl (meth)acrylate, pentyl (meth)acrylate, 2-ethylhexyl (meth)acrylate, and 2-hydroxyethyl (meth)acrylate.

In the invention, a (meth)acrylate other than methyl methacrylate is preferably an alkyl (meth)acrylate that includes a linear or branched alkyl group including at least two, particularly from two to eight, carbon atoms.

Examples of other monomer components include: cyclic group-containing (meth)acrylates, such as phenyl (meth)acrylate and benzyl (meth)acrylate; aromatic vinylmonomers, such as vinyl acetate, styrene, p-methylstyrene, α-methylstyrene, and vinylnaphthalene; cyanide vinylmonomers, such as acrylonitrile and methacrylonitrile; α,β-unsaturated carboxylic acids, such as acrylic acid, methacrylic acid, and crotonic acid; and maleimide compounds, such as N-ethylmaleimide and N-cyclohexyl maleimide. One type of the aforementioned component may be used alone, or two or more types may be used in combination.

In the present invention, in cases where the acrylic resin is a copolymer, a preferable blending amount of the monomer that can be included together with methyl methacrylate is from 0 to 20 wt %, preferably from 0 to 10 wt %, more preferably from 0 to 5 wt %, with respect to the entire acrylic resin. When the blending amount of the monomer component exceeds 20 wt %, the heat resistance of the acrylic resin may become insufficient.

In the invention, from the viewpoint of excellent heat resistance, it is preferable to employ, as the acrylic resin, a homopolymer of methyl methacrylate or a copolymer of methyl methacrylate and an alkyl (meth)acrylate that includes a linear or branched alkyl group including 2 to 8 carbon atoms.

In the invention, it is required that the acrylic resin has a glass transition temperature of at least 80° C. The use of an acrylic resin having a glass transition temperature below 80° C. may reduce the melt viscosity of the acrylic resin when molten and mixed/kneaded at a temperature of 200° C. or higher, which makes it impossible to form/mold a film. It should be noted that the upper limit of the glass transition temperature is 105° C. (which is an acrylic resin wherein the entire monomer component is methyl methacrylate).

In the invention, the glass transition temperature is found by measuring the heat absorption amount while raising the temperature of a sample at a rate of 10° C./min with a differential scanning calorimeter (DSC) in a nitrogen atmosphere; the intersection point between the baseline of the temperature-change chart and the tangential line at the inflection point ascribable to enthalpy relaxation of the sample is found as the glass transition temperature.

It should be noted that the glass transition temperature of a copolymer is the value calculated by applying the glass transition temperature and weight fraction of each monomer component to the Fox equation.

In the invention, examples of usable methods for curing the monomer component(s) constituting the acrylic resin include one-part curing methods, two-part curing methods employing a curing agent, and active energy ray curing methods in which curing is effected by irradiation with ultraviolet rays or ionizing radiation. In consideration of weather resistance, the UV curing method is preferable. In consideration of processability after being bonded to various substrates, a two-part curing method in which crosslinking is effected by isocyanate curing is preferable.

A radical polymerization initiator can be used at the time of polymerization of the acrylic resin. Examples of the radical polymerization initiator include photoradical polymerization initiators and thermal radical polymerization initiators.

Various conventionally known compounds can be used for the photoradical polymerization initiator, with examples including: ketone-based compounds, such as acetophenone-based compounds, benzil-based compounds, benzophenone-based compounds, and thioxanthone-based compounds; and oxime ester-based compounds.

Examples of the acetophenone-based compound include diethoxyacetophenone, 2-hydroxy-2-methyl-1-phenylpropan-1-one, 4'-isopropyl-2-hydroxy-2-methylpropiophenone, 2-hydroxymethyl-2-methylpropiophenone, 2,2-dimethoxy-1,2-diphenylethan-1-one, p-dimethylaminoacetophenone, p-tertiary-butyldichloroacetophenone, p-tertiary-butyltrichloroacetophenone, p-azidobenzalacetophenone, 1-hydroxycyclohexyl phenyl ketone, 2-methyl-1-[4-(methylthio)phenyl]-2-morpholinopropanone-1,2-benzyl-2-dimethylamino-1-(4-morpholinophenyl)-butanone-1, benzoin, benzoin methyl ether, benzoin ethyl ether, benzoin isopropyl ether, benzoin-n-butyl ether, benzoin isobutyl ether, and 1-[4-(2-hydroxyethoxy)-phenyl]-2-hydroxy-2-methyl-1-propan-1-one.

An example of the benzil-based compound includes benzil.

Examples of the benzophenone-based compound include benzophenone, methyl o-benzoylbenzoate, Michler's ketone, 4,4'-bisdiethylaminobenzophenone, 4,4'-dichlorobenzophenone, and 4-benzoyl-4'-methyldiphenyl sulfide.

Examples of the thioxanthone-based compound include thioxanthone, 2-methylthioxanthone, 2-ethylthioxanthone, 2-chlorothioxanthone, 2-isopropylthioxanthone, and 2,4-diethylthioxanthone.

Examples of the oxime-based compound include compounds disclosed in JP 2000-80068A, compounds disclosed in JP 2001-233842A, compounds disclosed in JP 2006-342166A, 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-(4-toluene sulfonyloxy)iminobutan-2-one, and 2-ethoxycarbonyloxyimino-1-phenylpropan-1-one.

Examples of other photoradical polymerization initiators include phosphine oxide-based compounds, such as 2,4,6-trimethylbenzoyldiphenylphosphine oxide, and titanocene-based compounds, such as bis(cyclopentadienyl)-bis[2,6-difluoro-3-(pyl-1-yl)]titanium.

Known peroxide-based compounds and azo compounds can be used for the thermal radical polymerization initiators.

Examples of the peroxide-based compounds include: ketone peroxides, such as methyl ethyl ketone peroxide, methyl isobutyl ketone peroxide, cyclohexanone peroxide, methylcyclohexane ketone peroxide, and acetylacetone peroxide; diacyl peroxides, such as isobutyl peroxide, m-chlorobenzoyl peroxide, 2,4-dichlorobenzoyl peroxide, α-methylbenzoyl peroxide, and bis-3,5,5-trimethylhexanoyl peroxide; hydroperoxides, such as 2,4,4-trimethylpentyl-2-hydroperoxide, diisopropylbenzene hydroperoxide, cumene hydroperoxide, and tert-butyl hydroperoxide; dialkyl peroxides, such as dicumyl peroxide, 2,5-dimethyl-2,5-di(tert-butylperoxy)hexane, 1,3-bis(tert-butylperoxyisopropyl)benzene, and tert-butylcumyl peroxide; peroxyketals, such as 1,1-di-tert-butylperoxy-3,3,5-trimethylcyclohexane, 2,2-di-(t-butylperoxy)butane, and 4,4-di-tert-butylperoxyvaleric acid n-butyl ester; alkyl peresters, such as 2,4,4-trimethylpentylperoxy phenoxyacetate, α-cumylperoxy neodecanoate, tert-butylperoxy benzoate, and di-tert-butylperoxy trimethyladipate; percarbonates, such as di-tert-methoxybutylperoxy dicarbonate, di-2-ethylhexylperoxy dicarbonate, bis(4-tert-butylcyclohexyl)peroxy dicarbonate, and diisopropylperoxy dicarbonate; other acetyl cyclohexyl sulfonyl peroxy dicarbonates and tert-butylperoxy allyl carbonates; and persulfates such as ammonium persulfate, sodium persulfate, and potassium persulfate.

Examples of the azo compounds include azobisisobutyronitrile, 1,1'-azobiscyclohexane-1-carbonitrile, 2-carbamoylazoisobutyronitrile, 2,2'-azobis-2,4,4-trimethylpentane, 2,2'-azobis-(2,4-dimethylvaleronitrile), 2,2'-azobis-(4-methoxy-2,4-dimethylvaleronitrile), 2,2'-azobis-(methylisobutyrate), α,α'-azobis-(isobutyronitrile), and 4,4'-azobis-(4-cyanovaleric acid).

As for polymerization, in cases of using the radical polymerization initiator, a solvent may be mixed as necessary, and a polymerization reaction can be effected by irradiation with active rays or application of heat within the range of from 80 to 150° C.

Examples of solvents include: water; ketones, such as methyl ethyl ketone, methyl amyl ketone, diethyl ketone, acetone, methyl isopropyl ketone, methyl isobutyl ketone, cyclohexanone, and 2-heptanone; ether-based solvents, such as ethyl ether, dioxane, tetrahydrofuran, 1,2-dimethoxyethane, 1,2-diethoxyethane, and dipropylene glycol dimethyl ether; ester-based solvents, such as methyl acetate, ethyl acetate, n-propyl acetate, isopropyl acetate, n-butyl acetate, cyclohexyl acetate, ethyl lactate, dimethyl succinate, and Texanol; cellosolve-based solvents, such as ethylene glycol monomethyl ether and ethylene glycol monoethyl ether; alcohol-based solvents, such as methanol, ethanol, iso- or n-propanol, iso- or n-butanol, and amyl alcohol; ether ester-based solvents, such as ethylene glycol monomethyl ether acetate, ethylene glycol monoethyl ether acetate, propylene glycol 1-monomethyl ether 2-acetate (PGMEA), dipropylene glycol monomethyl ether acetate, 3-methoxybutyl ether acetate, and ethoxyethyl ether propionate; BTX solvents, such as benzene, toluene, xylene, etc.; aliphatic hydrocarbon-based solvents, such as hexane, heptane, octane, and cyclohexane; terpene hydrocarbon oils, such as turpentine oil, D-limonene, and pinene; paraffinic solvents, such as mineral spirit, Swasol #310 (name of product from Cosmo Matsuyama Oil Co., Ltd.), and Solvesso #100 (name of product from Exxon Chemical); halogenated aliphatic hydrocarbon-based solvents, such as carbon tetrachloride, chloroform, trichloroethylene, methylene chloride, and 1,2-dichloroethane; halogenated aromatic hydrocarbon-based solvents, such as chlorobenzene; and carbitol solvents, aniline, triethylamine, pyridine, acetic acid, acetonitrile, carbon disulfide, N,N-dimethylformamide, N,N-dimethylacetamide, N-methylpyrrolidone, dimethyl sulfoxide, and water. One type of solvent may be used alone, or two or more types may be used as a mixed solvent.

As for light sources of the active rays, sources emitting light having a wavelength of from 300 to 450 nm can be used, with examples including ultra-high-pressure mercury lamps, mercury-vapor arc lamps, carbon arc lamps, and xenon arc lamps.

A continuous reaction tank provided in an existing polymerization facility can be used as-is for the polymerization tank employed for the aforementioned polymerization reaction. The invention is not particularly limited in terms of size, shape, material, etc., in relation to conventional polymerization facilities.

The molecular weight of the acrylic resin obtained by polymerization is preferably from 50,000 to 200,000, more preferably from 60,000 to 150,000, in terms of mass average molecular weight measured by GPC. This is preferable because, when the mass average molecular weight of the acrylic resin is 50,000 or higher, the molded article will have excellent strength and durability, and when the mass average molecular weight is 200,000 or lower, processability during molding, such as flowability, will be improved.

The triazine-based UV absorber used in the invention will be described.

The acrylic resin composition of the invention includes a triazine-based UV absorber having high absorptivity in the wavelength region from 280 to 300 nm. Among triazine-based UV absorbers, 2-(4,6-diphenyl-1,3,5-triazin-2-yl)-5-[2-(2-ethylhexanoyloxy)ethoxy]phenol has a high absorptivity in the aforementioned wavelength region and can maintain its absorptivity for a long period of time. Thus, in the present invention, the triazine-based UV absorber includes 2-(4,6-diphenyl-1,3,5-triazin-2-yl)-5-[2-(2-ethylhexanoyloxy)ethoxy]phenol as an essential component, and it is preferable that at least 80 wt %, more preferably at least 90 wt %, of the triazine-based UV absorber(s) used in the invention is 2-(4,6-diphenyl-1,3,5-triazin-2-yl)-5-[2-(2-ethylhexanoyloxy)ethoxy]phenol.

Examples of triazine-based UV absorbers other than the aforementioned 2-(4,6-diphenyl-1,3,5-triazin-2-yl)-5-[2-(2-ethylhexanoyloxy)ethoxy]phenol (referred to hereinafter also as "other triazine-based UV absorbers") include 4-(4,6-diphenyl-1,3,5-triazin-2-yl)benzene-1,3-diol, 2-(4,6-diphenyl-1,3,5-triazin-2-yl)-5-methoxyphenol, 2-(4,6-diphenyl-1,3,5-triazin-2-yl)-5-((6-hydroxyhexyl)oxy)phenol, bis (2-(4-(4,6-diphenyl-1,3,5-triazin-2-yl)-3-hydroxyphenoxy) ethyl)adipate, 6-(4-(4,6-diphenyl-1,3,5-triazin-2-yl)-3-hydroxyphenoxy)hexyl methacrylate, bis(2-(4-(4,6-diphenyl-1,3,5-triazin-2-yl)-3-hydroxyphenoxy)ethyl) dodecane dioate, 2-(4,6-diphenyl-1,3,5-triazin-2-yl)-5-[2-(2-ethylhexanoyloxy)ethoxy]phenol, 2-(2-hydroxy-4-[1-octyloxycarbonylethoxy]phenyl)-4,6-bis(4-phenylphenyl)-1,3,5-triazine, 2-(4,6-diphenyl-1,3,5-triazin-2-yl)-5-(hexyloxy)phenol, 2-(4,6-bis(2,4-dimethylphenyl)-1,3,5-triazin-2-yl)-5-(2-hydroxy-3-tridecyloxy)propoxy) phenol, trioctyl 2,2',2''-(((1,3,5-triazine-2,4,6-triyl)tris(3-hydroxybenzene-4,1-diyl))tris(oxy)tripropionate, 6,6'-(6-(2,4-dibutoxyphenyl)-1,3,5-triazine-2,4-diyl)bis(3-butoxyphenol), 2-(4,6-bis(2,4-dimethylphenyl)-1,3,5-triazin-2-yl)-5-((6-methylheptyl)oxy)phenol, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, and 2-(2,4-dihydroxy-3-allylphenyl)-4,6-bis(2,4-dimethylphenyl)-1,3,5-triazine.

The method for blending the aforementioned triazine-based UV absorber(s) to the acrylic resin is not particularly limited, and various known techniques for blending resin additives can be employed. For example, it is possible to employ a method of adding the absorber(s) to the polymerization system in advance at the time of polymerizing the acrylic resin, a method of adding the absorber(s) during polymerization, or a method of adding the absorber(s) after polymerization. In cases of blending the absorber(s) after polymerization of the acrylic resin, it is possible to employ, for example, a method of forming a mixture of the absorber(s) and powder/pellets of the polymerized acrylic resin with a Henschel mixer etc. and kneading the mixture by using a processing device such as an extruder, or a method of making the triazine-based UV absorber(s) into a master batch and blending the same to the acrylic resin. There is no particular limitation to the type of processing device to be used, the processing temperature, the cooling conditions after processing, etc. The conditions can be selected such that the physical properties of the obtained acrylic resin composition are suitable for the desired use/application. Granules may be prepared from the present acrylic resin composition alone, or from a mixture thereof with other resin additives or fillers described below, and such granules may be blended to the acrylic resin.

In the acrylic resin composition of the invention, the blending amount of the triazine-based UV absorber(s) with respect to 100 parts by mass of the acrylic resin is from 0.1 to 8 parts by mass, preferably from 1 to 5 parts by mass. This blending amount refers to the total amount of 2-(4,6-diphenyl-1,3,5-triazin-2-yl)-5-[2-(2-ethylhexanoyloxy)ethoxy] phenol and other triazine-based UV absorbers. When the amount is less than 0.1 parts by mass, absorptivity in the UV range may be insufficient. When the amount is greater than 8 parts by mass, conspicuous coloring may occur in the molded article which is obtained by molding and processing the acrylic resin composition.

Various generally-used resin additives may be added to the acrylic resin in amounts that do not impair the effects of the invention. Examples of such resin additives include phenol-based antioxidants, phosphorus-based antioxidants, thioether-based antioxidants, UV absorbers other than the triazine-based UV absorber, hindered amine compounds, nucleating agents, flame retardants, flame retardant assistants, lubricants, fillers, metal soaps, hydrotalcites, antistatic agents, pigments, and dyes.

Examples of the phenol-based antioxidants include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl)propionate], 2-methyl-4,6-bis(octylsulfanylmethyl)phenol, 2,2'-isobutylidene bis(4,6-dimethylphenol), isooctyl-3-(3,5-di-tert-butyl-4-hydroxyphenyl)propionate, N,N'-hexane-1,6-diyl bis[3-(3,5-di-tert-butyl-4-hydroxyphenyl) propionamide, 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), esters of 3,5-bis(1,1-dimethylethyl)-4-hydroxy-benzenepropanoic acid and $C_{13-15}$ alkyls, 2,5-di-tert-amylhydroquinone, hindered phenol polymer (product name "AO.OH.998" from Adeka Palmarole), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenz[d,f][1,3,2]-dioxaphosphepin, hexamethylene bis[3-(3,5-di-tert-butyl-4-hydroxyphenyl)propionate, calcium bis[monoethyl(3,5-di-tert-butyl-4-hydroxybenzyl)phosphonate, a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazin-2-ylamino)phenol, DL-α-tocophenol (vitamin E), 2,6-bis(α-methylbenzyl)-4-methylphenol, bis[3,3-bis-(4'-hydroxy-3'-tert-butyl-phenyl)butanoic acid] glycol ester, 2,6-di-tert-butyl-p-cresol, 2,6-diphenyl-4-octadecyloxyphenol, stearyl (3,5-di-tert-butyl-4-hydroxyphenyl)propionate, distearyl (3,5-di-tert-butyl-4-hydroxybenzyl)phosphonate, tridecyl-3,5-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid] glycol ester, 4,4'-butylidene bis(2,6-di-tert-butylphenol), 4,4'-butylidene bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3',5'-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethylene glycol bis[β-(3-tert-butyl-4-hydroxy-5-methylphenyl)propionate], and 3-(3,5-dialkyl-4-hydroxyphenyl)propionic acid derivatives, such as stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl)propionic acid amide, and lauryl-3-(3,5-di-tert-butyl-4-hydroxyphenyl)propionic acid amide. The usage amount of the phenol-based antioxidant is preferably from 0.001 to 5 parts by mass, more preferably from 0.03 to 3 parts by mass, with respect to 100 parts by mass of the acrylic resin.

Examples of the phosphorus-based antioxidants include triphenyl phosphite, diisooctyl phosphite, heptakis triphosphite, triisodecyl phosphite, diphenyl isooctyl phosphite, diisooctyl phenyl phosphite, diphenyl tridecyl phosphite, triisooctyl phosphite, trilauryl phosphite, diphenyl phosphite, tris(dipropylene glycol)phosphite, diisodecyl pentaerythritol diphosphite, dioleyl hydrogen phosphite, trilauryl trithiophosphite, bis(tridecyl)phosphite, tris(isodecyl) phosphite, tris(tridecyl)phosphite, diphenyldecyl phosphite, dinonyl phenyl-bis(nonylphenyl)phosphite, poly(dipropylene glycol)phenyl phosphite, tetraphenyl dipropyl glycol diphosphite, trisnonyl phenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri(decyl) phosphite, octyldiphenyl phosphite, di(decyl)monophenyl phosphite, distearyl pentaerythritol diphosphite, a mixture of distearyl pentaerythritol and calcium stearate, alkyl (C10) bisphenol A phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis (2,4,6-tri-tert-butylphenyl)pentaerythritol diphosphite, bis (2,4-dicumylphenyl)pentaerythritol diphosphite, tetraphenyl-tetra(tridecyl)pentaerythritol tetraphosphite, bis (2,4-di-tert-butyl-6-methylphenyl)ethyl phosphite, tetra(tridecyl)isopropylidene diphenol diphosphite, tetra(tridecyl)-4,4'-n-butylidene bis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propenyl-3-ylidene)-tris(1,1-dimethylethyl)-5-methyl-4,1-phenylene)hexatridecyl phosphite, 2,2'-methylene-bis(4,6-di-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene bis(3-methyl-6-tert-butylphenylditridecyl) phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5] undecane, 2,4,6-tri-tert-butylphenyl-2-butyl-2-ethyl-1,3-propanediol phosphite, and poly-4,4'-isopropylidene diphenol $C_{12-15}$ alcohol phosphite.

The usage amount of the phosphorus-based antioxidant is preferably from 0.001 to 10 parts by mass, more preferably from 0.01 to 0.5 parts by mass, with respect to 100 parts by mass of the acrylic resin.

Examples of the thioether-based antioxidants include tetrakis[methylene-3-(laurylthio)propionate]methane, bis (methyl-4-[3-n-alkyl (C12/C14)thiopropionyloxy]5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis (6-tert-butyl-p-cresol), and distearyl-disulfide.

The usage amount of the thioether-based antioxidant is preferably from 0.001 to 10 parts by mass, more preferably from 0.01 to 0.5 parts by mass, with respect to 100 parts by mass of the acrylic resin.

Examples of UV absorbers other than the aforementioned triazine-based UV absorber include: 2-hydroxybenzophenones, such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), a polyethylene glycol ester of 2-(2-hydroxy-3-tert-butyl-5-carboxyphenyl) benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl] benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, and 2-[2-hydroxy-4-(3-methacryloyloxypropyl)phenyl]benzotriazole; benzoates, such as phenyl salicylate, resorcinol monobenzoate, 2,4-di-tert-butylphenyl-3,5-di-tert-butyl-4-hydroxybenzoate, octyl (3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy) benzoate, octadecyl(3,5-di-tert-butyl-4-hydroxy)benzoate, and behenyl(3,5-di-tert-butyl-4-hydroxy)benzoate; substituted oxanilides, such as 2-ethyl-2'-ethoxyoxanilide and 2-ethoxy-4'-dodecyloxanilide; cyanoacrylates, such as ethyl-α-cyano-β,β-diphenylacrylate and methyl-2-cyano-3-methyl-3-(p-methoxyphenyl)acrylate; and various types of metal salts and metal chelates, particularly salts and chelates of nickel and chromium.

These other UV absorbers different from the aforementioned triazine-based UV absorber can be used in amounts that do not impair the effects of the invention.

More specifically, the total amount of the triazine-based UV absorber and UV absorbers other than the triazine-based absorber is preferably from 1 to 5 parts by mass with respect to 100 parts by mass of the acrylic resin, and more preferably, the usage amount of UV absorbers other than the triazine-based absorber is from 0.01 to 0.5 parts by mass with respect to 100 parts by mass of the acrylic resin.

Examples of the hindered-amine-based light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)·di(tridecyl)-1,2,3,4-butane tetracarboxylate, bis(1,2,2,6,6-pentamethyl-4-piperidyl)·di (tridecyl)-1,2,3,4-butane tetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2, 2,6,6-tetramethyl-4-piperidylamino)hexane/2,4-dichloro-6-tert-octylamino-s-triazine polycondensate, 1,5,8,12-tetrakis [2,4-bis(N-butyl-N-(2,2,6,6-tetramethyl-4-piperidyl) amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]aminoundecane, 1,6,11-tris[2, 4-bis(N-butyl-N-(1,2,2,6,6-pentamethyl-4-piperidyl)

amino)-s-triazin-6-yl]aminoundecane, bis{4-(1-octyloxy-2, 2,6,6-tetramethyl)piperidyl}decane dionate, bis{4-(2,2,6,6-tetramethyl-1-undecyloxy)piperidyl)carbonate, and TINUVIN NOR 371 from Ciba Specialty Chemicals.

The usage amount of the hindered amine-based light stabilizer is preferably from 0.001 to 5 parts by mass, more preferably from 0.005 to 0.5 parts by mass, with respect to 100 parts by mass of the acrylic resin.

Examples of the nucleating agents include: metal salts of carboxylic acids, such as sodium benzoate, aluminum 4-tert-butylbenzoate, sodium adipate, and 2-sodium bicyclo[2.2.1]heptane-2,3-dicarboxylate; metal salts of phosphates, such as sodium bis(4-tert-butylphenyl)phosphate, sodium 2,2'-methylene-bis(4,6-di-tert-butylphenyl)phosphate, and lithium 2,2'-methylene-bis(4,6-di-tert-butylphenyl)phosphate; polyol derivatives, such as dibenzylidene sorbitol, bis(methylbenzylidene)sorbitol, bis(3,4-dimethylbenzylidene)sorbitol, bis(p-ethylbenzylidene)sorbitol, and bis(dimethylbenzylidene)sorbitol; and amide compounds, such as N,N',N"-tris[2-methylcyclohexyl]-1,2,3-propane tricarboxamide, N,N',N"-tricyclohexyl-1,3,5-benzene tricarboxamide, N,N'-dicyclohexyl naphthalene dicarboxamide, and 1,3,5-tri(dimethylisopropoylamino)benzene.

The usage amount of the nucleating agent is preferably from 0.001 to 5 parts by mass, more preferably from 0.005 to 0.5 parts by mass, with respect to 100 parts by mass of the acrylic resin.

Examples of the flame retardants include: phosphorus-based flame retardants including aromatic phosphates such as triphenyl phosphate, tricresyl phosphate, trixylenyl phosphate, cresyl diphenyl phosphate, cresyl-2,6-dixylenyl phosphate, resorcinol bis(diphenylphosphate), (1-methylethylidene)-4,1-phenylene tetraphenyl diphosphate, 1,3-phenylene tetrakis(2,6-dimethylphenyl)phosphate, product name ADK STAB FP-500 from Adeka Corporation, product name ADK STAB FP-600 from Adeka Corporation, and product name ADK STAB FP-800 from Adeka Corporation, phosphonates such as divinyl phenylphosphonate, diallyl phenylphosphonate, and (1-butenyl)phenylphosphonate, phosphinates such as phenyl diphenylphosphinate, methyl diphenylphosphinate, and 9,10-dihydro-9-oxa-10-phosphaphenanthrene-10-oxide derivatives, phosphazene compounds such as bis(2-allylphenoxy)phosphazene and dicresylphosphazene, as well as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds, and red phosphorus; metal hydroxides such as magnesium hydroxide and aluminum hydroxide; and bromine-based flame retardants such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate, and brominated styrene. These flame retardants are preferably used in combination with an anti-drip agent such as a fluorine resin, and/or a flame retardant assistant such as a polyol or hydrotalcite.

The usage amount of the flame retardant is preferably from 1 to 50 parts by mass, more preferably from 10 to 30 parts by mass, with respect to 100 parts by mass of the acrylic resin.

The aforementioned lubricant is added to impart the surface of the molded article with lubricity and to improve the effect of preventing scratches/damage. Examples of lubricants include: unsaturated fatty acid amides such as oleamide and erucamide; saturated fatty acid amides such as behenamide and stearamide; and butyl stearate, stearyl alcohol, stearic acid monoglyceride, sorbitan monopalmitate, sorbitan monostearate, mannitol, stearic acid, hydrogenated castor oil, stearamide, oleamide, and ethylene-bis-stearamide. One type of lubricant may be used alone, or two or more types may be used in combination.

The usage amount of the lubricant is preferably from 0.03 to 2 parts by mass, more preferably from 0.01 to 0.5 parts by mass, with respect to 100 parts by mass of the acrylic resin.

Examples of the fillers include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fiber, clay, dolomite, mica, silica, alumina, potassium titanate whisker, wollastonite, and fibrous magnesium oxysulfate. Fillers may be used by selecting, as appropriate, the particle diameter (the fiber diameter, fiber length, and aspect ratio for fibrous fillers). The filler(s) to be used may be subjected to surface treatment if necessary.

The usage amount of the filler is preferably from 0.01 to 80 parts by mass, more preferably from 1 to 50 parts by mass, with respect to 100 parts by mass of the acrylic resin.

As for the metal soap, it is possible to use a salt between a metal, such as magnesium, calcium, aluminum, or zinc, and a saturated or unsaturated fatty acid, such as lauric acid, myristic acid, palmitic acid, stearic acid, behenic acid, or oleic acid.

The usage amount of the metal soap is preferably from 0.001 to 10 parts by mass, more preferably from 0.01 to 5 parts by mass, with respect to 100 parts by mass of the acrylic resin.

The aforementioned hydrotalcite is a naturally-occurring or synthetic composite salt compound including magnesium, aluminum, hydroxyl groups, carbonate groups, and optional water of crystallization, and examples include compounds in which a portion of magnesium and/or aluminum is substituted by an alkali metal or other metals such as zinc, and compounds in which the hydroxyl group(s) and/or carbonate group(s) is/are substituted by other anionic groups. More specifically, examples include compounds in which a metal in a hydrotalcite represented by the following general formula (2) is substituted by an alkali metal. Also, as for Al—Li-based hydrotalcites, it is possible to use a compound represented by the following general formula (3).

[Chem. 1]

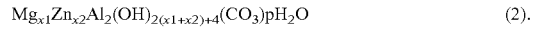

$$Mg_{x1}Zn_{x2}Al_2(OH)_{2(x1+x2)+4}(CO_3)pH_2O \qquad (2).$$

In the general formula (2), x1 and x2 each represent a number satisfying the conditions expressed by $0 \leq x2/x1 < 10$ and $2 \leq x1+x2 \leq 20$, and p represents 0 or a positive number.

[Chem. 2]

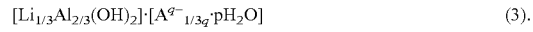

$$[Li_{1/3}Al_{2/3}(OH)_2] \cdot [A^{q-}{}_{1/3q} \cdot pH_2O] \qquad (3).$$

In the general formula (3), $A^{q-}$ represents a q-valent anion, and p represents 0 or a positive number.

Further, in the aforementioned hydrotalcite, a portion of the carbonate anion may be substituted by another anion.

The water of crystallization of the hydrotalcite may be dehydrated. The hydrotalcites may be covered by a higher fatty acid such as stearic acid, a higher fatty acid metal salt such as an alkali metal salt of oleic acid, an organic sulfonic acid metal salt such as an alkali metal salt of dodecylbenzene sulfonic acid, a higher fatty acid amide, a higher fatty acid ester, or a wax.

The hydrotalcite may be a naturally-occurring product or a synthetic product. Examples of methods for synthesizing such compounds include known methods disclosed, for example, in JP S46-2280B, JP S50-30039B, JP S51-29129B, JP H3-36839B, JP S61-174270A, and JP H5-179052A. Various hydrotalcites may be used regardless of crystal structure, crystal grain system, etc.

The usage amount of the hydrotalcite is preferably from 0.001 to 5 parts by mass, more preferably from 0.05 to 3 parts by mass, with respect to 100 parts by mass of the acrylic resin.

Example of the antistatic agents include: cationic antistatic agents such as quaternary ammonium ion salts of fatty acids and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates, and higher alcohol ethylene oxide adduct phosphates; nonionic antistatic agents such as polyol fatty acid esters, polyglycol phosphates, and polyoxyethylene alkylallyl ethers; and amphoteric antistatic agents such as amphoteric alkyl betaines, e.g. alkyl dimethylaminoacetic acid betaine, and imidazoline-type amphoteric activators. These antistatic agents may be used individually, or two or more types of antistatic agents may be used in combination.

The usage amount of the antistatic agent is preferably from 0.03 to 2 parts by mass, more preferably from 0.1 to 0.8 parts by mass, with respect to 100 parts by mass of the acrylic resin.

Commercially available pigments may be used for the aforementioned pigments, with examples including: pigment red 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; pigment orange 13, 31, 34, 36, 38, 43, 46, 48, 49, 51, 52, 55, 59, 60, 61, 62, 64, 65, and 71; pigment yellow 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; pigment green 7, 10, and 36; pigment blue 15, 15:1, 15:2, 15:3, 15:4, 15:5, 15:6, 22, 24, 56, 60, 61, 62, and 64; and pigment violet 1, 19, 23, 27, 29, 30, 32, 37, 40, and 50.

Examples of the dyes include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes, and cyanine dyes. A plurality of dyes may be used as a mixture.

The method for blending the aforementioned resin additive(s) to the acrylic resin is not particularly limited, and various known techniques for blending resin additives can be employed. For example, it is possible to employ a method of adding the additive(s) to the polymerization system in advance at the time of polymerizing the acrylic resin, a method of adding the additive(s) during polymerization, or a method of adding the additive(s) after polymerization. In cases of blending the additive(s) after polymerization of the acrylic resin, it is possible to employ, for example, a method of forming a mixture of the additive(s) and powder/pellets of the acrylic resin to be stabilized and kneading the mixture by using a processing device such as an extruder, or a method of making the present acrylic resin composition into a master batch and then blending the same to the acrylic resin. There is no particular limitation to the type of processing device to be used, the processing temperature, the cooling conditions after processing, etc. The blending conditions can be selected as appropriate such that the physical properties of the obtained resin are suitable for the intended use/application.

Granules may be prepared from the present acrylic resin composition alone, or by sprinkling the same onto other resin additives or fillers, and such granules may be blended to the acrylic resin.

In the invention, at the time of adding, to an acrylic resin, a triazine-based UV absorber including 2-(4,6-diphenyl-1,3,5-triazin-2-yl)-5-[2-(2-ethylhexanoyloxy)ethoxy]phenol and melting and mixing/kneading the mixture, it is preferable to perform mixing/kneading at an extrusion temperature within a range from 200° C. to 260° C., more preferably from 210° C. to 250° C.

If the extrusion temperature is below 200° C., the processing device may be subjected to increased load, and the surface of the molded article obtained by molding the acrylic resin composition may become rough. If the extrusion temperature is above 260° C., the molecular weight of the acrylic resin may drop, which may make molding impossible.

A laminate according to the invention has a structure in which a support material is covered by a molded article of the acrylic resin composition of the invention.

Preferably, the support material is covered by a film/sheet in which the thickness of the molded article of the acrylic resin composition of the invention is preferably from 30 to 300 μm, more preferably from 30 to 200 μm, even more preferably from 30 to 100 am.

If the thickness of the molded article of the acrylic resin composition is less than 30 μm, the strength may be insufficient and the molded article may be prone to break. If the thickness is greater than 300 μm, the heating time at the time of molding may become long, making it uneconomical.

In the invention, the support material is not particularly limited, and examples include methacrylic resins, polycarbonate resins, methyl methacrylate-styrene resins, polystyrene resins, polyvinyl chloride resins, polyester resins, and cyclic polyester resins. In the invention, polyvinyl chloride resins and polycarbonate resins can preferably be used because of excellent adhesion to the acrylic resin composition of the invention.

The aforementioned polyvinyl chloride resins can be polymerized according to any method without particular limitation, with examples including polymerization in bulk, polymerization in solution, suspension polymerization, and emulsion polymerization. Examples of the polyvinyl chloride resins include: various chlorine-containing resins such as polyvinyl chloride, chlorinated polyvinyl chloride, polyvinylidene chloride, chlorinated polyethylene, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride-isoprene copolymer, vinyl chloride-chlorinated propylene copolymer, vinyl chloride-vinylidene chloride-vinyl acetate terpolymer, vinyl chloride-maleate copolymer, vinyl chloride-methacrylate copolymer, vinyl chloride-acrylonitrile copolymer, and copolymers of vinyl chloride and various vinyl ethers; blends among the aforementioned resins; blends of the aforementioned resins and other synthetic resins not including chlorine, such as acrylonitrile-styrene copolymer, ethylene-vinyl acetate copolymer, ethylene-ethyl (meth)acrylate copolymer, or polyester; and blends of the aforementioned resins and block copolymers or graft copolymers.

Examples of methods for producing a laminate according to the invention include: coextrusion methods in which molding is performed by simultaneously melting and extruding a support material resin and the acrylic resin composition of the invention; methods of extrusion-molding a support material into a sheet, melting and extruding the acrylic resin composition of the invention, and laminating the same; methods of molding the acrylic resin composition of the invention into a sheet in advance, and thermally-laminating the acrylic resin composition sheet continuously at the time of extrusion-molding a support material; and methods of molding a support material into a sheet, and thermocompression-bonding the acrylic resin composition of the invention onto the support material sheet with a pressing machine.

The use/application of the molded article of the acrylic resin composition of the invention is not particularly limited, but particularly, can be used preferably for applications in which aesthetic appearance is deemed important. Examples of such applications include window materials for buildings, vehicles, etc., lighting covers, signboards, road signs, household goods, office supplies, windshields, water tanks, and protective sheets.

The applications of the laminate of the invention are the same as the applications of the support material. For example, in cases where the support material is a vinyl chloride-based resin or a polycarbonate resin, examples of applications include housings for electrical household appliances and electronic devices, construction materials, such as resin window sashes, window frames, decorative sheets, top rails, baseboards, floor materials, wall materials, and ceiling materials, as well as pipes, gutters, and ducts.

The present invention is described below according to Examples and Comparative Examples. The invention, however, is not to be limited to the following Examples etc.

{Production of Acrylic Resin}

Each of the monomer components described in Table 1 was dissolved in xylene. Azobisisobutyronitrile was added thereto as a radical polymerization initiator, and polymerization reaction was performed at 140° C. for 5 hours, to produce an acrylic resin. The glass transition temperature (Tg) and molecular weight of each obtained acrylic resin are shown in Table 1.

The molecular weight was measured according to the following measurement conditions by gel permeation chromatography (GPC) with a GPC device from JASCO Corporation.

Solvent: Tetrahydrofuran.

Reference substance: Polystyrene.

Detector: Refractive index detector (RI detector).

Column stationary phase: Shodex KF-804L from Showa Denko K.K.

Column temperature: 40° C.

Sample concentration: 1 mg/1 mL.

Flow rate: 0.8 mL/min.

Injection amount: 100 μL.

TABLE 1

|  | Monomer component [parts by mass] | | | |
| --- | --- | --- | --- | --- |
|  | AC-1 | AC-2 | AC-3 | AC-4 |
| Methyl methacrylate | 100 | 80 | 80 | 70 |
| Butyl methacrylate |  | 20 |  |  |
| Butyl acrylate |  |  | 20 |  |
| Ethyl acrylate |  |  |  | 30 |
| Tg [° C.] | 105 | 82 | 57 | 56 |
| Molecular weight | 87,000 | 119,000 | 79,000 | 92,000 |

Examples 1-1 to 1-6 and Comparative Examples 1-1 to 1-10

The obtained acrylic resin and a triazine-based UV absorber were mixed according to the blending amounts described in Table 2 or 3. With a biaxial extruder (L/D=30), the mixture was molten and mixed/kneaded at 250° C. and granulated, to obtain pellets. Note that, although melting and mixing/kneading were attempted by employing the acrylic resins AC-3 and AC-4 described in Table 1, granulation was impossible due to a significant drop in viscosity.

The obtained pellets were dried at 80° C. for over 10 hours. Then, the pellets were molten and mixed/kneaded with a T-die-equipped uniaxial extruder (product name OEX3024 from DDM Co., Ltd.) at a melting temperature of 240° C. and screw speed of 30 rpm, to obtain a 50 μm-thick acrylic resin sheet.

{Weather Resistance Test}

Each of the obtained acrylic resin sheets was subjected to a weather resistance test at a temperature of 63° C. and humidity of 50% RH under the UV irradiation conditions of 295-780 nm and 75 mW/cm$^2$. The ΔY.I. and molecular weight of each acrylic resin sheet after irradiation for 200 hours were measured.

As for ΔY.I., the difference between the Y.I. of each acrylic resin molded article after 200 hours of UV irradiation as measured by the reflection method using a multiple-light-source spectrophotometric colorimeter from Suga Test Instruments Co., Ltd. and the Y.I. before UV irradiation was evaluated as the ΔY.I. The results are shown in Tables 2 and 3.

TABLE 2

| | Example 1-1 | Example 1-2 | Example 1-3 | Comparative Example 1-1 | Comparative Example 1-2 | Comparative Example 1-3 | Comparative Example 1-4 | Comparative Example 1-5 |
|---|---|---|---|---|---|---|---|---|
| Acrylic resin [parts by mass] | | | | | | | | |
| AC-1 | 100 | 100 | 100 | 100 | 100 | 100 | 100 | 100 |
| Triazine-based UVA [parts by mass] | | | | | | | | |
| LA-46 | 1 | 3 | 5 | | 10 | | | |
| UVA-1 | | | | | | 3 | | |
| UVA-2 | | | | | | | 3 | |
| UVA-3 | | | | | | | | 3 |
| Evaluation | | | | | | | | |
| ΔY.I. | 1 | 1 | 2 | 1 | 4 | 3 | 5 | 4 |
| Rate of reduction in molecular weight [%] | 18.5 | 10.3 | 1.1 | 56.3 | 0.8 | 18.3 | 41.3 | 51.7 |

LA-46:
Name of product from Adeka Corporation; 2-(4,6-Diphenyl-1,3,5-triazin-2-yl)-5-[2-(2-ethylhexanoyloxy)ethoxy]phenol.
UVA-1: 2-[4,6-Bis(2,4-dimethylphenyl)-1,3,5-triazin-2-yl]-5-(octyloxy)phenol.
UVA-2: 2,4-Bis(2,4-dimethylphenyl)-6-(2-hydroxy-4-octyloxyphenyl)-1,3,5-triazine.
UVA-3: 1-(4-(4,6-Bis(2,4-dimethylphenyl)-1,3,5-triazin-2-yl)-3-methylphenoxy)-3-($C_{12-13}$ alkyloxy)propan-2-ol.

TABLE 3

| | Example 1-4 | Example 1-5 | Example 1-6 | Comparative Example 1-6 | Comparative Example 1-7 | Comparative Example 1-8 | Comparative Example 1-9 | Comparative Example 1-10 |
|---|---|---|---|---|---|---|---|---|
| Acrylic resin [parts by mass] | | | | | | | | |
| AC-2 | 100 | 100 | 100 | 100 | 100 | 100 | 100 | 100 |
| Triazine-based UVA [parts by mass] | | | | | | | | |
| LA-46 | 1 | 3 | 5 | | 10 | | | |
| UVA-1 | | | | | | 3 | | |
| UVA-2 | | | | | | | 3 | |
| UVA-3 | | | | | | | | 3 |
| Evaluation | | | | | | | | |
| ΔY.I. | 1 | 1 | 2 | 0 | 4 | 3 | 6 | 5 |
| Rate of reduction in molecular weight [%] | 7.1 | 3.4 | 0 | 11.8 | 0 | 8.4 | 18.5 | 18.5 |

Examples 2-1 to 2-3 and Comparative Examples 2-1 to 2-4

With respect to 100 parts by mass of each acrylic resin described in Table 1, a UV absorber was mixed according to the blending amounts described in Table 4 or 5. With a biaxial extruder (L/D=30), the mixture was molten and mixed/kneaded at 250° C. and granulated, to obtain pellets.

The obtained pellets were dried at 80° C. for over 10 hours. Then, the pellets were molten and mixed/kneaded with a T-die-equipped uniaxial extruder (product name OEX3024 from DDM Co., Ltd.) at an extrusion temperature of 240° C. and screw speed of 30 rpm, to obtain a 50-μm-thick acrylic resin sheet. The acrylic resin sheet was placed on the surface of a flat-plate-shaped molded article made of a vinyl chloride resin and being 80 mm long, 40 mm wide, and 2 mm thick, and was laminated by performing thermocompression at 140° C. with a press forming machine. The following evaluation was performed using the laminated test pieces.

{Weather Resistance Test}

Each of the test pieces laminated onto the vinyl chloride resin-made flat-plate-shaped molded article was subjected to a weather resistance test at a temperature of 63° C. and humidity of 50% RH under the UV irradiation conditions of 295-780 nm and 75 mW/cm. The difference in color (ΔE) of the vinyl chloride resin-made test piece after 200 hours was measured. The color difference was measured by the reflection method using a multiple-light-source spectrophotometric colorimeter from Suga Test Instruments Co., Ltd. The results are shown in Table 4 below.

TABLE 4

| | Example 2-1 | Example 2-2 | Example 2-3 | Comparative Example 2-1 | Comparative Example 2-2 | Comparative Example 2-3 | Comparative Example 2-4 |
|---|---|---|---|---|---|---|---|
| Acrylic resin [parts by mass] | | | | | | | |
| AC-1 | 100 | 100 | 100 | 100 | 100 | 100 | 100 |
| Triazine-based UVA [parts by mass] | | | | | | | |
| LA-46 | 1 | 3 | 5 | | | | |
| UVA-1 | | | | | 3 | | |
| UVA-2 | | | | | | 3 | |
| UVA-3 | | | | | | | 3 |
| Evaluation | | | | | | | |
| ΔE (after 100 hours) | 10 | 8 | 6 | 52 | 12 | 17 | 20 |
| ΔE (after 200 hours) | 18 | 13 | 9 | 74 | 20 | 32 | 40 |

Examples 3-1 and 3-2 and Comparative Examples 3-1 to 3-4

Laminated test pieces were prepared in the same manner as in Example 2-1, except that: the acrylic resin was changed from AC-1 to AC-2; each UV absorber was added according to the blending amounts described in Table 5; and the 80-mm-long, 40-mm-wide, 2-mm-thick vinyl chloride resin-made flat-plate-shaped molded article was changed to a 80-mm-long, 40-mm-wide, 2-mm-thick polycarbonate resin-made flat-plate-shaped molded article.

{Weather Resistance Test}

Each of the test pieces laminated onto the polycarbonate resin-made flat-plate-shaped molded article was subjected to a weather resistance test at a temperature of 65° C. and humidity of 50% RH under the UV irradiation condition of 295-780 nm with a xenon lamp. The difference in color (ΔE) of the test piece after 1080 hours and after 2040 hours of UV irradiation was measured. The color difference was measured by the reflection method using a multiple-light-source spectrophotometric colorimeter from Suga Test Instruments Co., Ltd. The results are shown in Table 5 below.

TABLE 5

| | Example 3-1 | Example 3-2 | Comparative Example 3-1 | Comparative Example 3-2 | Comparative Example 3-3 | Comparative Example 3-4 |
|---|---|---|---|---|---|---|
| Acrylic resin [parts by mass] | | | | | | |
| AC-2 | 100 | 100 | 100 | 100 | 100 | 100 |
| UV absorber [parts by mass] | | | | | | |
| LA-46 | 3 | 5 | | | | |
| UVA-1 | | | | 3 | | |
| UVA-2 | | | | | 3 | |
| UVA-3 | | | | | | 3 |
| Evaluation (Y.I.) | | | | | | |
| Initial Y.I. | 10 | 10 | 10 | 10 | 12 | 11 |
| ΔE (1080 hours) | 9 | 9 | 25 | 11 | 14 | 14 |
| ΔE (2040 hours) | 10 | 10 | 40 | 13 | 20 | 20 |

As described above, by employing an acrylic resin including at least 80 wt % of methyl methacrylate and having a glass transition temperature of at least 80° C., a molded article can be obtained, even when molten and mixed/kneaded at 250° C. The aforementioned acrylic resin compositions include from 1 to 5 parts by mass of a triazine-based UV absorber including 2-(4,6-diphenyl-1,3,5-triazin-2-yl)-5-[2-(2-ethylhexanoyloxy)ethoxy]phenol with respect to 100 parts by mass of the acrylic resin including at least 80 wt % of methyl methacrylate and having a glass transition temperature of at least 80° C. According to these Examples, it was verified that excellent weather resistance can be achieved and coloring can be suppressed.

Further, it was verified that excellent weather resistance is achieved also in test pieces in which a vinyl chloride resin or a polycarbonate resin is laminated by molding the acrylic resin composition of the invention.

The invention claimed is:

1. A molded article obtained by melting and mixing/kneading an acrylic resin composition at a temperature of about 250° C.,
    wherein the acrylic resin composition comprises, with respect to 100 parts by mass of an acrylic resin, from 1 to 5 parts by mass of a triazine-based UV absorber consisting of 2-(4,6-diphenyl-1,3,5-triazin-2-yl)-5-[2-(2-ethylhexanoyloxy)ethoxy]phenol,
    wherein the acrylic resin consists of methyl methacrylate and optionally butyl methacrylate as monomer components, a blending amount of methyl methacrylate being 80 wt % or more, and a blending amount of butyl methacrylate being 20 wt % or less, wherein the acrylic resin has a glass transition temperature of from 82° C. to 105° C., and wherein the molecular weight of the acrylic resin is 87,000 to 119,000 in terms of mass average molecular weight.

2. A laminate in which a surface of a support material is covered by a thermoplastic resin layer having a thickness of from 30 to 300 μm, wherein the thermoplastic resin layer is formed by melting and mixing/kneading an acrylic resin composition at a temperature of about 250° C., wherein the acrylic resin composition comprises, with respect to 100 parts by mass of an acrylic resin, from 1 to 5 parts by mass of a triazine-based UV absorber consisting of 2-(4,6-diphenyl-1,3,5-triazin-2-yl)-5-[2-(2-ethylhexanoyloxy)ethoxy]phenol, wherein the acrylic resin consists of methyl methacrylate and optionally butyl methacrylate as monomer components, a blending amount of methyl methacrylate being 80 wt % or more, and a blending amount of butyl methacrylate being 20 wt % or less, wherein the acrylic resin has a glass transition temperature of from 82° C. to 105° C., and wherein the molecular weight of the acrylic resin is 87,000 to 119,000 in terms of mass average molecular weight.

3. The laminate according to claim 2, wherein the support material is selected from a vinyl chloride resin or a polycarbonate resin.

* * * * *